(12) United States Patent
Suzuki et al.

(10) Patent No.: US 9,435,034 B2
(45) Date of Patent: Sep. 6, 2016

(54) MANUFACTURING METHOD FOR STEEL SHEETS FOR CONTAINERS

(75) Inventors: Takeshi Suzuki, Tokyo (JP); Norihiko Nakamura, Tokyo (JP); Yuka Miyamoto, Tokyo (JP); Yoichi Tobiyama, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 282 days.

(21) Appl. No.: 13/823,379

(22) PCT Filed: Sep. 14, 2011

(86) PCT No.: PCT/JP2011/070981
§ 371 (c)(1),
(2), (4) Date: Apr. 30, 2013

(87) PCT Pub. No.: WO2012/036200
PCT Pub. Date: Mar. 22, 2012

(65) Prior Publication Data
US 2013/0206285 A1 Aug. 15, 2013

(30) Foreign Application Priority Data
Sep. 15, 2010 (JP) ................. 2010-207342

(51) Int. Cl.
| | | |
|---|---|---|
| *C23C 22/36* | (2006.01) | |
| *C23C 22/82* | (2006.01) | |
| *C23C 22/05* | (2006.01) | |
| *B32B 1/08* | (2006.01) | |
| *B32B 15/09* | (2006.01) | |
| *B32B 15/18* | (2006.01) | |
| *C23C 22/83* | (2006.01) | |
| *C25D 9/04* | (2006.01) | |
| *C25D 9/10* | (2006.01) | |
| *C21D 8/02* | (2006.01) | |
| *C25D 11/34* | (2006.01) | |
| *C22C 38/08* | (2006.01) | |
| *C25D 11/00* | (2006.01) | |
| *C23C 22/34* | (2006.01) | |
| *C23C 22/73* | (2006.01) | |
| *C25D 5/12* | (2006.01) | |
| *C25D 5/48* | (2006.01) | |
| *C23C 28/00* | (2006.01) | |
| *C23C 10/28* | (2006.01) | |
| *B32B 15/01* | (2006.01) | |
| *C23C 22/50* | (2006.01) | |

(52) U.S. Cl.
CPC ............. *C23C 22/05* (2013.01); *B32B 1/08* (2013.01); *B32B 15/013* (2013.01); *B32B 15/015* (2013.01); *B32B 15/09* (2013.01); *B32B 15/18* (2013.01); *C21D 8/0278* (2013.01); *C22C 38/08* (2013.01); *C23C 10/28* (2013.01); *C23C 22/34* (2013.01); *C23C 22/361* (2013.01); *C23C 22/73* (2013.01); *C23C 22/83* (2013.01); *C23C 28/321* (2013.01); *C23C 28/322* (2013.01); *C23C 28/34* (2013.01); *C25D 5/12* (2013.01); *C25D 5/48* (2013.01); *C25D 9/04* (2013.01); *C25D 9/10* (2013.01); *C25D 11/00* (2013.01); *C25D 11/34* (2013.01); *B32B 2250/03* (2013.01); *B32B 2250/40* (2013.01); *B32B 2255/06* (2013.01); *B32B 2255/205* (2013.01); *B32B 2255/26* (2013.01); *B32B 2255/28* (2013.01); *B32B 2439/66* (2013.01)

(58) Field of Classification Search
CPC ....... C23C 22/05; C23C 22/07; C23C 22/34; C23C 22/36; C23C 22/361; C23C 22/82
See application file for complete search history.

(56) References Cited

U.S. PATENT DOCUMENTS
2010/0203355 A1    8/2010  Kadowaki et al.

FOREIGN PATENT DOCUMENTS
| | | | |
|---|---|---|---|
| JP | 2004-307923 | 11/2004 | |
| JP | 2009-068108 | 4/2009 | |
| JP | 2009-249691 | 10/2009 | |
| JP | 2010-013728 | * 1/2010 | ............ B32B 15/01 |
| WO | 2009-025390 | 2/2009 | |

OTHER PUBLICATIONS

Nov. 7, 2013, Official Action issued in corresponding Colombian Application No. 13-052444 on Dec. 2, 2013.
"A Clean Alternative for Galvanic Wastewater Treatment: Literature Review", Alvaro Porras, et al., Engineer Magazine of the Medellin University. vol. 8, No. 14, pp. 39-50. Medellin-Colombia. English Abstract is included on p. 40.
International Search Report PCT/JP2011/070981 dated Dec. 20, 2011, with English translation.
Chinese Office Action dated Sep. 22, 2015 in corresponding Chinese Patent Application No. 201180044011.4 with English translation of Chinese Office Action.
Taiwanese Office Action dated Oct. 16, 2015 in corresponding Taiwanese Patent Application No. 100133002.
Chinese Official Action—2011800440114—Apr. 22, 2015.

* cited by examiner

*Primary Examiner* — Lois Zheng
(74) *Attorney, Agent, or Firm* — Young & Thompson

(57) ABSTRACT

A manufacturing method for steel sheets for containers produces steel sheets with excellent film adhesion qualities. In a method for manufacturing steel sheets upon which is formed a chemical conversion coating having a metal Zr content of 1-100 mg/m² and F content of no more than 0.1 mg/m², the chemical conversion coating is formed on the steel sheet by subjecting the steel sheet to immersion in or electrolytic treatment with a treatment solution containing Zr ions and F ions, and subsequently, the steel sheet upon which the chemical conversion coating has been formed is washed with water having a temperature of at least 80° C. and dried.

20 Claims, No Drawings

MANUFACTURING METHOD FOR STEEL SHEETS FOR CONTAINERS

TECHNICAL FIELD

The present invention relates to a manufacturing method for steel sheets for containers.

BACKGROUND ART

In any type of can, steel sheets for use in cans (steel sheets for containers) have conventionally been coated but in recent years a film lamination technique has drawn attention as a technique to replace coating and has spread rapidly from the viewpoint of global environmental protection.

A chromate coating has conventionally been formed on a steel sheet for use in the undercoat of a laminated film but recently there have started to be calls for restrictions to be imposed on the use of hazardous substances such as lead and cadmium and for attention to be paid to the working environment of manufacturing plants and there have been requests to stop the use of a chromate coating.

In the beverage container market, cans face competition from containers such as PET bottles, bottles and drink boxes in terms of cost and quality, and steel sheets for laminated containers are also required to have more excellent formability in can manufacture (in particular, in terms of film adhesion, formed film adhesion, corrosion resistance).

For example, Patent Literature 1 discloses, as a steel sheet meeting such requirements, a steel sheet for containers having a zirconium compound coating formed on the steel sheet by subjecting the steel sheet to immersion or electrolytic treatment in a solution containing zirconium ions, fluorine ions, ammonium ions and nitrate ions, the coating weight of the zirconium compound coating being 1 to 100 mg/m$^2$ in terms of zirconium metal content and up to 0.1 mg/m$^2$ in terms of fluorine content ([Claim 1]).

CITATION LIST

Patent Literature

Patent Literature 1: JP 2010-13728 A

SUMMARY OF INVENTION

Technical Problems

As described above, competition in terms of quality has been increasing recently in the beverage container market and steel sheets for laminated containers are also required to have more excellent film adhesion. In particular, the film in the neck portion of a can formed after necking is generally prone to coming off and therefore a steel sheet for containers in which delamination does not occur in the neck portion even under severe conditions has been desired.

The inventors of the invention have conducted studies on film adhesion in the neck portion (hereinafter also referred to as "high film adhesion") using the steel sheet for containers as disclosed in Patent Literature 1 and found that the film adhesion does not reach the level now required and an improvement is necessary.

Accordingly, the present invention aims to provide a method of manufacturing a steel sheet for containers capable of obtaining a steel sheet for containers which is excellent in terms of high film adhesion.

Solution to Problems

The inventors of the invention carried out intensive studies to solve the above-described problems and as a result found that a steel sheet for containers which is excellent in terms of high film adhesion is obtained by forming a specified chemical conversion coating on a steel sheet and then washing the steel sheet with water at a temperature of 80° C. or more and then drying the steel sheet, and the invention has been thus completed.

Specifically, the invention provides the following (1) to (6).

(1) A method of manufacturing a steel sheet for containers which has a chemical conversion coating formed on the steel sheet and containing 1 to 100 mg/m$^2$ of zirconium metal and up to 0.1 mg/m$^2$ of fluorine, the method comprising: forming the chemical conversion coating on the steel sheet by subjecting the steel sheet to immersion in a treatment solution containing zirconium ions and fluorine ions or to electrolytic treatment using the treatment solution; then washing the steel sheet having the chemical conversion coating formed thereon with water at a temperature of 80° C. or more; and then drying the steel sheet.

(2) The method of manufacturing a steel sheet for containers according to (1) above, wherein a temperature for the drying is 70° C. or more.

(3) The method of manufacturing a steel sheet for containers according to (1) or (2) above, wherein the treatment solution further contains phosphate ions, and wherein the chemical conversion coating contains 0.1 to 50 mg/m$^2$ of phosphorus.

(4) The method of manufacturing a steel sheet for containers according to (3) above, wherein the treatment solution further contains a phenolic resin, and wherein the chemical conversion coating contains 0.1 to 50 mg/m$^2$ of carbon.

(5) The method of manufacturing a steel sheet for containers according to any one of (1) to (4) above, wherein the steel sheet has a surface-treatment layer formed on at least one side of the steel sheet and containing 10 to 1,000 mg/m$^2$ of nickel in terms of nickel metal amount or 100 to 15,000 mg/m$^2$ of tin in terms of tin metal amount.

(6) The method of manufacturing a steel sheet for containers according to any one of (1) to (4) above, wherein a surface of the steel sheet is plated with a nickel or an iron-nickel alloy to form a nickel undercoat layer, a tin-plating coating is then provided on the nickel undercoat layer, and part of the tin-plating coating is alloyed with part or all of the nickel undercoat layer by tin melting treatment to form a tin-plating layer containing tin islands, wherein the nickel undercoat layer contains 5 to 150 mg/m$^2$ of nickel in terms of nickel metal amount, and wherein the tin-plating layer contains 300 to 3,000 mg/m$^2$ of tin in terms of tin metal amount.

Advantageous Effects of Invention

The invention can provide a method of manufacturing a steel sheet for containers capable of obtaining a steel sheet for containers which is excellent in terms of high film adhesion.

DESCRIPTION OF EMBODIMENTS

The invention provides a method of manufacturing a steel sheet for containers which has a chemical conversion coating formed on the steel sheet and containing 1 to 100 mg/m$^2$ of zirconium metal and up to 0.1 mg/m² of fluorine, the method comprising: forming the chemical conversion coating on the steel sheet by subjecting the steel sheet to immersion in a treatment solution containing zirconium ions, fluorine ions, ammonium ions and nitrate ions or to electrolytic treatment using the treatment solution; then washing the steel sheet having the chemical conversion coating formed thereon with water at a temperature of 80° C. or more; and then drying the steel sheet.

The method of manufacturing the steel sheet for containers according to the invention is described below in detail.

[Steel Sheet]

A steel sheet that may be used in the invention is not particularly limited and base steel sheets for use as container materials can be generally used. There are also no particular limitations on the method of manufacturing the base steel sheets and the type of material, and use may be made of base steel sheets obtained through manufacturing steps including an ordinary billet forming step, hot rolling, pickling, cold rolling, annealing and temper rolling.

The steel sheet for use in the invention may have a surface-treatment layer formed on at least one side thereof and containing nickel (Ni) and/or tin (Sn).

Such a surface-treatment layer is, for example, a nickel-plating layer, a tin-plating layer or a tin-nickel alloy plating layer.

Nickel affects, for example, coating adhesion, film adhesion, corrosion resistance and weldability. The nickel metal content in the surface-treatment layer is preferably from 10 to 1,000 mg/m² for the reason that these properties are more excellent when the nickel metal content is within this range and from an economic point of view.

Tin affects, for example, formability, weldability and corrosion resistance. With regard to this, the tin metal content in the surface-treatment layer is preferably from 100 to 15,000 mg/m² for the reason that these properties are more excellent when the tin metal content is within this range and from an economic point of view, preferably from 200 to 15,000 mg/m² because of more excellent weldability, and more preferably from 1,000 to 15,000 mg/m² because of more excellent formability.

The method for forming the surface-treatment layer (plating layer) is not particularly limited. For example, known methods including electroplating, immersion plating, vacuum deposition and sputtering can be used and heating treatment may also be combined to form a diffusion layer.

The nickel-plating layer may be a layer formed by nickel metal plating or an iron-nickel-alloy plating layer formed by iron (Fe)-nickel (Ni) alloy plating.

The tin-plating layer is formed by tin metal plating (tin plating) but the tin plating as used in the invention includes cases where irreversible impurities are incorporated in the tin metal and cases where trace elements are added to the tin metal.

In the practice of the invention, a tin-plating layer containing tin islands may be formed. In this case, the surface of the steel sheet is plated with nickel or an iron-nickel alloy to form a nickel undercoat layer, on which is then provided a tin-plating coating, and part of the tin-plating coating is alloyed with part or all of the nickel undercoat layer by tin melting treatment to form the tin-plating layer containing tin islands.

Tin is melted by the tin melting treatment (reflow treatment) and alloyed with the steel sheet or the nickel undercoat layer to form a tin-iron-alloy layer or a tin-iron-nickel-alloy layer, whereby the alloy layer has improved corrosion resistance and tin alloy islands are formed. The tin alloy islands can be formed by properly controlling the tin melting treatment.

Since nickel is a metal which is highly resistant to corrosion, the iron- and tin-containing alloy layer formed by the tin melting treatment can have improved corrosion resistance.

The nickel undercoat layer preferably contains 5 to 150 mg/m² of nickel metal from the viewpoint of realizing the corrosion resistance and from an economic point of view.

In cases where heating treatment is performed to form a diffusion layer as the nickel undercoat layer, nitriding treatment may be performed before or after the heating treatment or simultaneously therewith.

The excellent corrosion resistance of tin is significantly improved at a tin metal content of 300 mg/m² or more and the degree of improvement of the corrosion resistance is also increased with increasing tin content. Therefore, the tin metal content in the tin-island-containing tin-plating layer is preferably 300 mg/m² or more. In addition, the corrosion-resistance-improving effect becomes saturated at a tin metal content exceeding 3,000 mg/m² and hence the tin content is preferably up to 3,000 mg/m² from an economic point of view.

Tin, which has a low electric resistance, is flexible and is spread by application of voltage between electrodes during welding to ensure a stable electric conduction area, and hence exhibits particularly excellent weldability. The excellent weldability is exhibited at a tin metal content of 100 mg/m² or more. The weldability-improving effect does not become saturated at a tin metal content within a range in which the excellent corrosion resistance as described above is exhibited. Therefore, the tin metal content is preferably at least 300 mg/m² but not more than 3,000 mg/m² in order to ensure that the steel sheet has excellent corrosion resistance and weldability.

The nickel metal content or the tin metal content in the surface-treatment layer may be measured by, for example, a fluorescent X-ray method. In this case, a nickel deposition amount sample in which the nickel metal content is known is used to specify the calibration curve for the nickel metal content in advance and the calibration curve is used to relatively specify the nickel metal content. The same applies to the tin metal content, and a tin deposition amount sample in which the tin metal content is known is used to specify the calibration curve for the tin metal content in advance and the calibration curve is used to relatively specify the tin metal content.

[Chemical Conversion Coating]

The chemical conversion coating is a coating formed on the above-described steel sheet and containing 1 to 100 mg/m² of zirconium metal and up to 0.1 mg/m² of fluorine.

Exemplary methods for forming the chemical conversion coating include a method involving immersion treatment in which a steel sheet is immersed in a treatment solution (acidic solution) containing zirconium ions and fluorine ions dissolved therein; and a method involving cathodic electrolytic treatment in a treatment solution containing zirconium ions and fluorine ions. A method involving cathodic electrolytic treatment is preferable because a uniform coating can be obtained.

Particularly in the cathodic electrolytic treatment, the treatment solution preferably contains both nitrate ions and ammonium ions. This makes it possible to perform the treatment in a short period of time from about a few seconds to about several tens of seconds and to form a chemical conversion coating having an excellent effect in improving the corrosion resistance and adhesion.

The treatment solution may also contain phosphate ions.

In cases where the cathodic electrolytic treatment is performed, the cell temperature in the cathodic electrolytic treatment is preferably from 10 to 40° C. from such viewpoints as efficiency in coating formation, cost and uniformity in the structure of the formed coating (cathodic electrolytic treatment at low temperatures). The electrolytic current density in the cathodic electrolytic treatment is preferably from 0.05 to 50 A/dm$^2$ from the viewpoint of suppression of a decrease in coating weight, stable coating formation, treatment time and suppression of a decrease in coating characteristics. In addition, the current flow time in the cathodic electrolytic treatment is preferably from 0.01 to 5 seconds from the viewpoint of suppression of the reduced coating weight, stable coating formation, treatment time and suppression of a decrease in coating characteristics.

The chemical conversion coating contains a zirconium compound. The zirconium compound serves to secure the corrosion resistance and adhesion. Examples of the zirconium compound are considered to include a zirconium hydrous oxide and a zirconium-phosphorus oxide and these zirconium compounds have excellent corrosion resistance and adhesion. "Zirconium hydrous oxide" refers to a compound formed by mixing zirconium oxide and zirconium hydroxide together.

The chemical conversion coating containing at least 1 mg/m$^2$ of zirconium metal ensures that the corrosion resistance and adhesion are at levels causing no practical problem. At a zirconium metal content in excess of 100 mg/m$^2$, the adhesion of the chemical conversion coating itself is deteriorated and the electric resistance is increased, which deteriorates the weldability. Therefore, the zirconium metal content in the chemical conversion coating is from 1 to 100 mg/m$^2$, preferably from 1 to 20 mg/m$^2$ and more preferably from 1 to 10 mg/m$^2$.

More excellent corrosion resistance and adhesion are achieved with increasing content of the zirconium-phosphorus oxide but this effect can be clearly recognized when the phosphorus content is at least 0.1 mg/m$^2$. At a phosphorus content in excess of 50 mg/m$^2$, the adhesion is deteriorated and the electric resistance is increased, which deteriorates the weldability. Therefore, the phosphorus content in the chemical conversion coating is preferably from 0.1 to 50 mg/m$^2$, preferably from 0.1 to 20 mg/m$^2$ and more preferably from 0.1 to 10 mg/m$^2$.

Fluorine is included in the treatment solution and is hence incorporated in the coating together with the zirconium compound. Fluorine in the coating does not affect the adhesion of a coating material or a film at a general level but may deteriorate the adhesion upon performance of retort treatment or other high-temperature sterilization treatments and may deteriorate resistance to rusting or corrosion under the coated film. This is presumably because fluorine in the coating leaches out into water vapor or etching solution and decomposes the bonds with an organic coating or corrodes the underlying steel sheet.

The fluorine content in the chemical conversion coating is up to 0.1 mg/m$^2$ because these properties obviously begin to deteriorate at a fluorine content in excess of 0.1 mg/m$^2$.

In order to adjust the fluorine content in the chemical conversion coating to 0.1 mg/m$^2$ or less, formation of the chemical conversion coating should be followed by cleaning through immersion in hot water or spraying. In this process, the fluorine content can be reduced by increasing the treatment temperature or the treatment time.

For example, the fluorine content in the chemical conversion coating can be adjusted to 0.1 mg/m$^2$ or less by immersion in hot water at 40° C. or more for at least 0.5 seconds or spraying.

The zirconium metal content, phosphorus content and fluorine content in the chemical conversion coating can be measured by, for example, a quantitative analysis method such as fluorescent X-ray analysis.

The ammonium ion concentration and the nitrate ion concentration in the treatment solution may be appropriately adjusted in accordance with the production equipment and the production rate (capacity) in ranges of about 100 to about 10,000 ppm and about 1,000 to about 20,000 ppm, respectively.

The treatment solution may also contain a phenolic resin. The phenolic resin contains as a constituent, for example, a water-soluble phenolic resin modified with N,N-diethanolamine.

A composite coating of the zirconium compound and the phenolic resin is formed by using the treatment solution containing the phenolic resin. Since the phenolic resin itself is an organic substance, the steel sheet for containers has good adhesion to the laminated film.

On one hand, carbon content in the chemical conversion coating of less than 0.1 mg/m$^2$ does not ensure adhesion at a practical level. On the other hand, at a carbon content in excess of 50 mg/m$^2$, the electric resistance is increased, which deteriorates the weldability. Therefore, the carbon content in the chemical conversion coating is preferably from 0.1 to 50 mg/m$^2$, preferably from 0.1 to 10 mg/m$^2$ and more preferably from 0.1 to 8 mg/m$^2$.

The carbon content in the chemical conversion coating can be measured by subtracting the amount of carbon present in the steel sheet using a TOC (total organic carbon meter).

[Cleaning]

In the practice of the invention, after the chemical conversion coating is formed, the steel sheet having the chemical conversion coating formed thereon is washed with water at a temperature of 80° C. or more and more preferably 90° C. or more and then dried. It is deemed that such cleaning properly roughens the surface of the chemical conversion coating to enhance the high film adhesion in the resulting steel sheet for containers.

Such cleaning is also effective in reducing the fluorine content by removing fluorine present in the chemical conversion coating.

The cleaning method is not particularly limited and examples thereof include a method in which the steel sheet having the chemical conversion coating formed thereon is immersed in water; and a method in which water is sprayed or otherwise applied to the steel sheet having the chemical conversion coating formed thereon.

In the case of immersion, the immersion time is not particularly limited and is preferably at least 1 second.

The drying temperature is not particularly limited and is preferably 70° C. or more.

EXAMPLES

The invention is described below more specifically by way of examples. However, the invention should not be construed as being limited to these examples.

[Surface-Treated Layer]

The following treatment processes (1-0) to (1-7) were used to form a surface-treatment layer on each steel sheet with a sheet thickness of 0.17 to 0.23 mm.

(1-0) A base sheet subjected to annealing and pressure adjustment after cold rolling was degreased and pickled to prepare a steel sheet.

(1-1) A base sheet subjected to annealing and pressure adjustment after cold rolling was degreased, pickled and plated with a tin-nickel alloy in a sulfuric acid-hydrochloric acid bath to prepare a nickel/tin-plated steel sheet.

(1-2) A base sheet subjected to annealing and pressure adjustment after cold rolling was degreased, pickled and plated with nickel using a Watts bath to prepare a nickel-plated steel sheet.

(1-3) Cold rolling was followed by nickel plating using a Watts bath and a nickel diffusion layer was formed during annealing to prepare a nickel-plated steel sheet.

(1-4) A base sheet subjected to annealing and pressure adjustment after cold rolling was degreased, pickled and plated with tin using a Ferrostan bath to prepare a tin-plated steel sheet.

(1-5) A base sheet subjected to annealing and pressure adjustment after cold rolling was degreased, pickled, plated with tin using a Ferrostan bath and subjected to tin melting treatment (reflow treatment) to prepare a tin-plated steel sheet having a tin alloy layer.

(1-6) A base sheet after cold rolling was degreased, pickled, plated with nickel using a Watts bath, underwent formation of a nickel diffusion layer during annealing, was degreased, pickled, plated with tin using a Ferrostan bath, and then subjected to tin melting treatment to prepare a nickel/tin-plated steel sheet having a tin alloy layer.

(1-7) A base sheet subjected to annealing and pressure adjustment after cold rolling was degreased, pickled, plated with an iron-nickel alloy using a sulfuric acid-hydrochloric acid bath and subsequently plated with tin using a Ferrostan bath and then subjected to tin melting treatment (reflow treatment) to prepare a nickel/tin-plated steel sheet having a tin alloy layer.

When the treatments of (1-6) and (1-7) were performed, the surface was observed with an optical microscope and evaluated in terms of the state of the tin islands. Then, islands were confirmed to be formed over the entire surface.

[Chemical Conversion Coating]

After the surface-treatment layer was formed by the above-described treatments, a chemical conversion coating was formed by the following treatment processes (2-1) to (2-3).

(2-1) The above-described steel sheets were immersed in a treatment solution containing $K_2ZrF_6$ (4.3 g/L) dissolved therein and adjusted to a pH of 2.65 by addition of ammonium nitrate, and subjected to cathodic electrolysis at a cell temperature of 30° C. under the conditions shown in Table 1 to form a chemical conversion coating.

(2-2) The above-described steel sheets were immersed in a treatment solution containing $K_2ZrF_6$ (4.3 g/L) and phosphoric acid (1.2 g/L) dissolved therein and adjusted to a pH of 2.65 by addition of ammonium nitrate, and subjected to cathodic electrolysis at a cell temperature of 30° C. under the conditions shown in Table 1 to form a chemical conversion coating.

(2-3) The above-described steel sheets were immersed in a treatment solution containing $K_2ZrF_6$ (4.3 g/L), sodium phosphate (1.4 g/L) and a phenolic resin (0.7 g/L) dissolved therein and adjusted to a pH of 2.65 by addition of phosphoric acid, and subjected to cathodic electrolysis at a cell temperature of 30° C. under the conditions shown in Table 1 to form a chemical conversion coating.

The above-described water-soluble phenolic resin modified with N,N-diethanolamine (weight-average molecular weight: 5,000) was used as the phenolic resin.

[Cleaning]

After the chemical conversion coating was formed by the above-described treatments, cleaning was performed by the following treatment processes (3-1) to (3-3).

(3-1) The above-described steel sheets were immersed in water at 75° C. for 2 seconds and dried at 75° C.

(3-2) The above-described steel sheets were immersed in water at 80° C. for 2 seconds and dried at 75° C.

(3-3) The above-described steel sheets were immersed in water at 95° C. for 2 seconds and dried at 75° C.

In each of Examples and Comparative Examples, the nickel metal content and the tin metal content in the surface-treatment layer were measured by a fluorescent X-ray method and specified using calibration curves. The amounts of zirconium metal, phosphorus and fluorine contained in the chemical conversion coating were measured by a quantitative analysis method such as fluorescent X-ray analysis. The amount of carbon contained in the chemical conversion coating was measured by subtracting the amount of carbon present in the steel sheet using a TOC (total organic carbon meter).

[Performance Evaluation]

The samples obtained by the above-described treatments were evaluated for the high film adhesion.

First, both surfaces of the sample in each of Examples and Comparative Examples were laminated with a PET film with a thickness of 20 μm at 200° C. and the sample was subjected to drawing and ironing to prepare a can. The thus prepared can was necked to form a neck portion. The can was subjected to retort treatment at 120° C. for 30 minutes to evaluate the state of film delamination at the neck portion.

More specifically, a sample having no delamination was rated "excellent", a sample having slight delamination that does not cause a practical problem was rated "good", a sample having partial delamination that does cause a practical problem was rated "fair" and a sample in which delamination occurred over large areas thereof was rated "poor." The results are shown in Table 1.

TABLE 1

| Table 1 | | Surface-treatment layer | | Chemical conversion coating | | | | | | | | |
|---|---|---|---|---|---|---|---|---|---|---|---|---|
| | | Treatment | Ni content (mg/m²) | Sn content (mg/m²) | Treatment | Current density (A/dm²) | Electrolysis time (sec) | Zr content (mg/m²) | F content (mg/m²) | P content (mg/m²) | C content (mg/m²) | Cleaning | Evaluation High film adhesion |
| EX | 1 | 1-0 | — | — | 2-3 | 53 | 2 | 76 | 0.01 or less | 15 | 11 | 3-2 | Good |
| | 2 | 1-0 | — | — | 2-3 | 53 | 2 | 78 | 0.01 or less | 16 | 11 | 3-3 | Excellent to good |
| | 3 | 1-1 | 80 | 450 | 2-3 | 22 | 1 | 25 | 0.01 or less | 8 | 8 | 3-2 | Excellent |
| | 4 | 1-2 | 460 | — | 2-3 | 17 | 1 | 22 | 0.01 or less | 8 | 24 | 3-2 | Excellent |
| | 5 | 1-3 | 930 | — | 2-3 | 24 | 2 | 39 | 0.01 or less | 10 | 25 | 3-2 | Excellent |

TABLE 1-continued

| Table 1 | | Surface-treatment layer | | Chemical conversion coating | | | | | | | | |
|---|---|---|---|---|---|---|---|---|---|---|---|---|
| | Treatment | Ni content (mg/m$^2$) | Sn content (mg/m$^2$) | Treatment | Current density (A/dm$^2$) | Electrolysis time (sec) | Zr content (mg/m$^2$) | F content (mg/m$^2$) | P content (mg/m$^2$) | C content (mg/m$^2$) | Cleaning | Evaluation High film adhesion |
| 6 | 1-4 | — | 2600 | 2-3 | 3 | 1 | 9 | 0.01 or less | 4 | 16 | 3-2 | Good |
| 7 | 1-5 | — | 13500 | 2-3 | 1 | 1 | 4 | 0.01 or less | 2 | 14 | 3-2 | Good |
| 8 | 1-6 | 70 | 800 | 2-3 | 15 | 1 | 21 | 0.01 or less | 8 | 19 | 3-2 | Excellent |
| 9 | 1-7 | 40 | 1200 | 2-3 | 2 | 1 | 7 | 0.01 or less | 3 | 22 | 3-2 | Excellent |
| 10 | 1-1 | 80 | 450 | 2-1 | 3 | 1 | 8 | 0.01 or less | — | — | 3-2 | Good |
| 11 | 1-1 | 80 | 450 | 2-1 | 3 | 1 | 8 | 0.01 or less | — | — | 3-3 | Excellent to good |
| 12 | 1-1 | 80 | 450 | 2-2 | 2 | 1 | 6 | 0.01 or less | 3 | — | 3-2 | Good |
| 13 | 1-1 | 80 | 450 | 2-2 | 2 | 1 | 6 | 0.01 or less | 3 | — | 3-3 | Excellent to good |
| CE 1 | 1-0 | — | — | 2-3 | 53 | 2 | 79 | 0.01 or less | 16 | 11 | 3-1 | Poor |
| 2 | 1-1 | 80 | 450 | 2-3 | 22 | 1 | 25 | 0.01 or less | 8 | 10 | 3-1 | Fair |
| 3 | 1-2 | 460 | — | 2-3 | 17 | 1 | 22 | 0.01 or less | 8 | 24 | 3-1 | Fair |
| 4 | 1-3 | 930 | — | 2-3 | 24 | 2 | 40 | 0.01 or less | 10 | 25 | 3-1 | Fair |
| 5 | 1-4 | — | 2600 | 2-3 | 3 | 1 | 9 | 0.01 or less | 4 | 16 | 3-1 | Fair to poor |
| 6 | 1-5 | — | 13500 | 2-3 | 1 | 1 | 4 | 0.01 or less | 2 | 14 | 3-1 | Poor |
| 7 | 1-6 | 70 | 800 | 2-3 | 15 | 1 | 21 | 0.01 or less | 8 | 19 | 3-1 | Fair |
| 8 | 1-7 | 40 | 1200 | 2-3 | 2 | 1 | 7 | 0.01 or less | 3 | 22 | 3-1 | Fair |
| 9 | 1-1 | 80 | 450 | 2-1 | 3 | 1 | 8 | 0.01 or less | — | — | 3-1 | Poor |
| 10 | 1-1 | 80 | 450 | 2-2 | 2 | 1 | 6 | 0.01 or less | 3 | — | 3-1 | Fair to poor |

The results shown in Table 1 revealed that Comparative Examples 1 to 10 in which formation of the chemical conversion coating was followed by washing with water at a temperature of 75° C. are all inferior in terms of high film adhesion.

In contrast, it was revealed that Examples 1 to 13 in which formation of the chemical conversion coating was followed by washing with water at a temperature of 80° C. or more are all superior in terms of high film adhesion.

It was revealed that Examples 2 to 13 having the surface-treatment layer are superior in terms of high film adhesion to Example 1 having no surface-treatment layer.

In addition, the comparison between Examples 1 and 2 revealed that Example 2 in which washing with water at a temperature of 95° C. was performed is superior in terms of high film adhesion to Example 1 in which washing with water at a temperature of 80° C. was performed. It was revealed that Examples 10 and 11 as well as Examples 12 and 13 also show the same tendency.

The invention claimed is:

1. A method of manufacturing a steel sheet for containers which has a chemical conversion coating formed on the steel sheet and containing 1 to 100 mg/m$^2$ of zirconium metal and up to 0.1 mg/m$^2$ of fluorine, the method comprising:
   forming the chemical conversion coating on the steel sheet by subjecting the steel sheet to immersion in a treatment solution containing zirconium ions, phosphate ions, phenolic resin and fluorine ions or to electrolytic treatment using the treatment solution;
   washing the steel sheet having the chemical conversion coating formed thereon with water at a temperature of 80° C. or more but not more than 95° C.; and
   drying the steel sheet.

2. The method of manufacturing a steel sheet for containers according to claim 1, wherein a temperature for the drying is 70° C. or more.

3. The method of manufacturing a steel sheet for containers according to claim 2,
   wherein the treatment solution further contains phosphate ions, and
   wherein the chemical conversion coating contains 0.1 to 50 mg/m$^2$ of phosphorus.

4. The method of manufacturing a steel sheet for containers according to claim 3, wherein the steel sheet has a surface-treatment layer formed on at least one side of the steel sheet and containing 10 to 1,000 mg/m$^2$ of nickel in terms of nickel metal amount or 100 to 15,000 mg/m$^2$ of tin in terms of tin metal amount.

5. The method of manufacturing a steel sheet for containers according to claim 2, wherein the steel sheet has a surface-treatment layer formed on at least one side of the steel sheet and containing 10 to 1,000 mg/m$^2$ of nickel in terms of nickel metal amount or 100 to 15,000 mg/m$^2$ of tin in terms of tin metal amount.

6. The method of manufacturing a steel sheet for containers according to claim 2,
   wherein a surface of the steel sheet is plated with nickel or an iron-nickel alloy to form a nickel undercoat layer, a tin-plating coating is then provided on the nickel undercoat layer, and part of the tin-plating coating is alloyed with part or all of the nickel undercoat layer by tin melting treatment to form a tin-plating layer containing tin islands,
   wherein the nickel undercoat layer contains 5 to 150 mg/m$^2$ of nickel in terms of nickel metal amount, and
   wherein the tin-plating layer contains 300 to 3,000 mg/m$^2$ of tin in terms of tin metal amount.

7. The method of manufacturing a steel sheet for containers according to claim 1,
   wherein the chemical conversion coating contains 0.1 to 50 mg/m$^2$ of phosphorus.

8. The method of manufacturing a steel sheet for containers according to claim 7,
   wherein the chemical conversion coating contains 0.1 to 50 mg/m$^2$ of carbon.

9. The method of manufacturing a steel sheet for containers according to claim 8, wherein the steel sheet has a surface-treatment layer formed on at least one side of the steel sheet and containing 10 to 1,000 mg/m$^2$ of nickel in terms of nickel metal amount or 100 to 15,000 mg/m$^2$ of tin in terms of tin metal amount.

10. The method of manufacturing a steel sheet for containers according to claim 8,
wherein a surface of the steel sheet is plated with nickel or an iron-nickel alloy to form a nickel undercoat layer, a tin-plating coating is then provided on the nickel undercoat layer, and part of the tin-plating coating is alloyed with part or all of the nickel undercoat layer by tin melting treatment to form a tin-plating layer containing tin islands,
wherein the nickel undercoat layer contains 5 to 150 mg/m$^2$ of nickel in terms of nickel metal amount, and
wherein the tin-plating layer contains 300 to 3,000 mg/m$^2$ of tin in terms of tin metal amount.

11. The method of manufacturing a steel sheet for containers according to claim 7, wherein the steel sheet has a surface-treatment layer formed on at least one side of the steel sheet and containing 10 to 1,000 mg/m$^2$ of nickel in terms of nickel metal amount or 100 to 15,000 mg/m$^2$ of tin in terms of tin metal amount.

12. The method of manufacturing a steel sheet for containers according to claim 7,
wherein a surface of the steel sheet is plated with nickel or an iron-nickel alloy to form a nickel undercoat layer, a tin-plating coating is then provided on the nickel undercoat layer, and part of the tin-plating coating is alloyed with part or all of the nickel undercoat layer by tin melting treatment to form a tin-plating layer containing tin islands,
wherein the nickel undercoat layer contains 5 to 150 mg/m$^2$ of nickel in terms of nickel metal amount, and
wherein the tin-plating layer contains 300 to 3,000 mg/m$^2$ of tin in terms of tin metal amount.

13. The method of manufacturing a steel sheet for containers according to claim 1, wherein the steel sheet has a surface-treatment layer formed on at least one side of the steel sheet and containing 10 to 1,000 mg/m$^2$ of nickel in terms of nickel metal amount or 100 to 15,000 mg/m$^2$ of tin in terms of tin metal amount.

14. The method of manufacturing a steel sheet for containers according to claim 3,
wherein a surface of the steel sheet is plated with nickel or an iron-nickel alloy to form a nickel undercoat layer, a tin-plating coating is then provided on the nickel undercoat layer, and part of the tin-plating coating is alloyed with part or all of the nickel undercoat layer by tin melting treatment to form a tin-plating layer containing tin islands,
wherein the nickel undercoat layer contains 5 to 150 mg/m$^2$ of nickel in terms of nickel metal amount, and
wherein the tin-plating layer contains 300 to 3,000 mg/m$^2$ of tin in terms of tin metal amount.

15. The method of manufacturing a steel sheet for containers according to claim 1,
wherein a surface of the steel sheet is plated with nickel or an iron-nickel alloy to form a nickel undercoat layer, a tin-plating coating is then provided on the nickel undercoat layer, and part of the tin-plating coating is alloyed with part or all of the nickel undercoat layer by tin melting treatment to form a tin-plating layer containing tin islands,
wherein the nickel undercoat layer contains 5 to 150 mg/m$^2$ of nickel in terms of nickel metal amount, and
wherein the tin-plating layer contains 300 to 3,000 mg/m$^2$ of tin in terms of tin metal amount.

16. The method of manufacturing a steel sheet for containers according to claim 1, wherein the treatment solution is acidic.

17. The method of manufacturing a steel sheet for containers according to claim 1, wherein the electrolytic treatment is cathodic electrolytic treatment, and the treatment solution contains both nitrate and ammonium ions.

18. The method of manufacturing a steel sheet for containers according to claim 17, wherein the cathodic electrolytic treatment is performed at a temperature of 10° C. to 40° C. at an electrolytic current density of 0.05 to 50 A/dm$^2$.

19. A method of manufacturing a steel sheet for containers which has a chemical conversion coating formed on the steel sheet and containing 1 to 100 mg/m$^2$ of zirconium metal and up to 0.1 mg/m$^2$ of fluorine, the method comprising:
forming the chemical conversion coating on the steel sheet by subjecting the steel sheet to immersion in a treatment solution containing zirconium ions, phosphate ions, phenolic resin and fluorine ions or to electrolytic treatment using the treatment solution;
washing the steel sheet having the chemical conversion coating formed thereon with water at a temperature of 80° C. or more but not more than 95° C.; and
drying the steel sheet,
wherein the chemical conversion coating contains 0.1 to 50 mg/m$^2$ of phosphorus and 0.1 to 50 mg/m$^2$ of carbon.

20. The method of manufacturing a steel sheet for containers according to claim 19, wherein a temperature for the drying is 70° C. or more.

* * * * *